United States Patent [19]
Karnes et al.

[11] 3,738,555
[45] June 12, 1973

[54] APPARATUS FOR MOVING WIRE

[75] Inventors: Donovan Karnes; Marion F. Centliver, both of Troy, Ohio

[73] Assignee: Hobart Brothers Company, Troy, Ohio

[22] Filed: July 7, 1972

[21] Appl. No.: 269,721

Related U.S. Application Data

[62] Division of Ser. No. 40,189, May 25, 1970, abandoned.

[52] U.S. Cl. ............................... 226/168, 226/188
[51] Int. Cl. ............................................ B65h 17/24
[58] Field of Search ........................... 214/338, 339; 226/168, 195, 181, 111, 188; 74/25; 219/130

[56] References Cited
UNITED STATES PATENTS
3,424,012  1/1969  Hirmann .............................. 74/25

*Primary Examiner*—Richard A. Schacher
*Assistant Examiner*—Gene A. Church
*Attorney*—Edward P. Forgrave

[57] ABSTRACT

An apparatus for moving cylindrical members, particularly welding wire, includes a rotary to linear actuator having an axially extending opening through which wire is fed, at least a pair of opposed rollers mounted on the actuator body, the axis of each being skewed or inclined relative to the direction of wire feed, which rotate with the body to impart a component of force to the wire to move it linearly through the actuator. Each roller is carried by an arm pivotally mounted on the actuator body and each arm includes a centrifugal weight which forces the roller against the wire as the actuator is rotated. Biasing means, such as torsion bars or small springs assist in holding the rollers against the wire at low rotational speeds. The actuator may be rotated by a motor having an axiably extending opening through its armature through which the wire may be fed to the actuator.

8 Claims, 24 Drawing Figures

Patented June 12, 1973 3,738,555

Patented June 12, 1973

APPARATUS FOR MOVING WIRE

RELATED APPLICATION

This application is a division of application Ser. No. 40,189, filed May 25, 1970 now abandoned.

BACKGROUND OF THE INVENTION

In some welding situations, it is convenient to use a hand held welding gun which supplies a consumable welding wire at a controlled rate to the weld. Such guns may also include means for supplying a shielding gas to envelop the weld and means for supplying electrical current to the consumable wire. One such welding gun is shown in U.S. Pat. No. 3,093,728.

Since the operator must hold the gun continuously during welding, it is desirable that the gun be made as lightweight as possible. Also, reducing the size of the gun simplifies storage and handling.

In prior art welding guns, a consumable welding wire is usually passed between drive rollers, at least one of which is knurled and driven by an electric motor. Frequently, the other roller is spring biased toward the driven roller to insure that enough frictional force is available to move the wire. Thus, as the wire is initially fed into the gun, the bias of the springs must be overcome before the wire will pass between the rollers. With this type of gun, however, slippage between the rollers and the wire tends to abrade the wire and remove its protective coating. Also, the residue from such abrasion may eventually cause a malfunction of the gun.

SUMMARY OF THE INVENTION

This invention relates to an improved apparatus for moving small diameter cylindrical members and employs a novel rotary to linear actuator. The invention is particularly useful in a welding gun since it permits the gun to be lightweight and small in diameter to facilitate use by the operator.

Rotary to linear actuators have been employed which use inclined contact rollers engaging a rigid cylindrical member. When the inclined rollers are rotated around the cylindrical member, they will follow a helical path relative to the member, and since the rollers are prevented from moving in the axial direction, a part of the rotary motion is converted to linear movement of the member. The greater the angle the axis of the rollers make with respect to the axis of the cylindrical member, the greater will be the linear velocity imparted to the cylindrical member for a given rotational speed. One such rotary to linear motion device is shown in U. S. Pat. No. 2,152,518.

In a preferred embodiment of this invention, the rotary to linear motion actuator includes a body having a wire receiving opening extending therethrough which is coaxial with its axis of rotation. At least a pair of opposed rollers are mounted on the body in mutually opposed relation to the opening and spaced radially from the axis of rotation of the body, with the axis of the rollers being skewed or inclined so that a portion of the rotary motion of the rollers around the axis of the body will impart linear motion to a wire fed through the opening in the body. The rollers are carried by arms pivotally mounted to the actuator body, and each arm includes a weight which, as the actuator body is rotated, will move outwardly due to centrifugal force to force the rollers against the wire. Thus, as the actuator is rotated, a component of velocity is imparted by the rollers to the wire in the axial direction in direct proportion to its rotational speed. In one preferred embodiment, two pairs of opposed rollers are used with each roller engaging the wire at approximately 90° intervals.

Biasing means assist in urging the rollers into positive contact with the wire for initial starting and continued operation at low rotational speeds of the body. The biasing means may include small springs which are positioned either between the actuator body and the centrifugal weights or between the weights on one arm and the roller supporting part of the arm supporting the other roller of the mutually opposed pair of rollers. The biasing means may also include torsion bars pivotally supporting the rollers and weight carrying arms with the torsion bars being arranged to bias the rollers against the wire.

This invention is useful in many applications, such as a hand held welding gun or as a device for moving wire. For example, it may be desirable to place a reel of wire at one location and move this wire through a substantial length of cable to another location. Since frictional forces increase with the length of the cable, merely providing a source of motive force at either end of the cable may not be sufficient to move the wire without damage. A wire feeding mechanism of the type described above could be installed at one or more intermediate locations to provide the additional force needed to move the wire under these circumstances.

It is desirable to maintain the wire in tension throughout the length of the cable due to the low column strength of small diameter wires, and for this reason, the intermediate wire feeding mechanisms located closest to the wire source are designed to move the wire at slightly slower speeds than those located further from the wire source.

Also, the wire feeding apparatus of this invention may be designed so that it will not damage the wire if the wire is restrained from movement while the rotary to linear actuator continues to rotate. In other words, an intermediate source of motive force could be run continuously, if desired, even though the wire may be stalled, thus eliminating the need for extra switching circuits, or it may be operated as a constant torque device with appropriate electrical circuitry.

To prevent the wire from being distorted excessively or damaged as it is moved by the actuator due to forces exerted by the rollers, the contact force between the rollers and the wire is limited. The forces exerted by the rollers on the wire are determined by the rotational speed of the actuator, the force of the biasing means, and by the contact area between each roller and the wire.

It has been found that in some situations, especially where it is not intended that the wire slip relative to the actuator, it is preferred that the force exerted by the rollers be increased until some small amount of yielding of the surface of the wire results at the point of contact between the rollers and the wire. As a result, the force moving the wire in the linear direction exceeds that which would be expected if only the coefficient of friction between the wire and rollers is considered.

Sufficient force to move the wire is obtained by providing a plurality of mutually opposed pairs of inclined rollers, thus distributing the forces along the wire. In order to obtain the sufficient driving force for wires having low tensile strength, such as aluminum, while at the same time avoiding distorting or damaging the wire, several pairs of mutually opposed, inclined rollers are used with each roller exerting less force than those rollers which are used to move steel wire. In the preferred embodiment of the invention, four pairs of mutually opposed inclined rollers are used for steel while eight pairs of mutually opposed rollers are used to impart the same driving force to aluminum wire.

In a welding gun, a gas passageway for inert shielding gas is formed in the gun housing to direct the gas around the motor and the rotary to linear actuators. The gas flow will cool the motor and remove dirt and wire surface contaminates carried by the wire which may be knocked loose by the inclined wire engaging rollers and would otherwise build up in the gun housing.

Accordingly, it is an object of this invention to provide an improved feeding device for cylindrical members comprising a rotatably mounted body having means defining a member receiving opening therein, a plurality of member engaging free turning drive rollers mounted for rotation with said body and positioned with respect to the opening through said body to engage a cylindrical member fed therethrough.

Another object of this invention is to provide an improved feeding apparatus of the type described including the combination of a drive motor having an axially extending opening in its armature through which a cylindrical member may freely pass and a rotary to linear actuator including at least one pair of opposed rollers having the axis of the rollers radially spaced from and at an angle to the axis of rotation of the actuator to engage the cylindrical member and move it linearly in response to the rotation of the actuator.

Another object of this invention is to provide an improved feeding apparatus employing the rotary to linear motion actuator as described above wherein the means for driving the actuator is axially aligned with the actuator, thus providing feeding apparatus of small cylindrical dimensions.

Another object of this invention is to provide an improved rotary to linear actuator for feeding cylindrical members, such as wire, of the type described wherein a pair of opposed inclined rollers are carried by arms pivotally mounted to a rotating body, one end of each arm including centrifugal weights which will force the rollers into positive engagement with the member as the body is rotated to impart linear motion to the member.

It is another object of this invention to provide an improved apparatus for moving a cylindrical member of the type described including biasing means for urging the roller against the member at low rotational speeds of the apparatus in one embodiment, each roller supporting arm is mounted on the body by a torsion bar which is arranged to preload and urge the roller into engagement with the member. In another embodiment, springs preload the rollers into positive contact with the member.

It is a further object of this invention to provide a feeding mechanism of the type described which is self-threading, that is, which readily accepts and thereafter moves a cylindrical member fed into the actuator.

Another object of this invention is to provide an improved apparatus for moving wire, particularly for moving welding or filler wire through substantial lengths of cable while maintaining the wire in tension by designing or operating the wire feeding mechanism located closest to the source of wire to move the wire at a slightly slower speed than those wire feeding mechanisms located further from the wire source.

Another object of this invention is to provide an improved apparatus for moving wire, especially small diameter and/or low tensile strength wires, wherein a pair of rotary to linear actuators are rotated in opposite directions, but move the wire in the same direction, to eliminate any tendency for the wire to twist.

Another object of this invention is to provide a novel rotary to linear actuator wherein the pulling force for moving a wire can be increased by adding additional pairs of mutually opposed, inclined rollers, while maintaining the contact force of the rollers against the wires below that which would cause damage or substantial yielding of the wire surface.

Another object of this invention is to provide an improved welding gun of the type described in which the inert gas used for welding is directed around the motor to cool it and around the rotary to linear actuators to assist in removing wire surface contaminates carried by the wire into the welding gun.

Other objects and advantages of the invention will be apparent from the following description, the accompanying drawings and the appended claims.

DETAILED DESCRIPTION OF THE PREFERRED EMBODIMENTS

Figure 1:
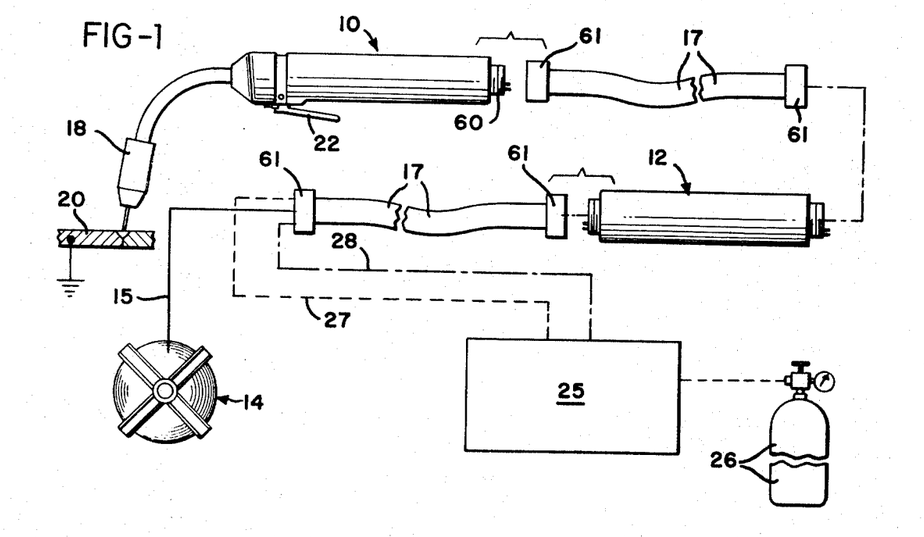
FIG. 1 is a generally schematic view showing a welding gun and a wire feeding device located intermediately of a substantial length of conduit utilizing the wire feeding apparatus of this invention.

Referring now to the drawings, the wire moving apparatus of this invention may be included in either a hand held welding gun 10 or a booster or intermediate wire moving assembly 12 located between the hand held gun 10 and a reel of welding wire 14, as shown in FIG. 1. Welding wire 15 is moved through a cable 17 which is also adapted to carry shielding gas and electrical current to the welding gun 10. The wire and the gas is directed under the control of an operator through a nozzle 18 to a workpiece 20.

The operator controls the flow of gas and the welding wire by a manually actuated switch 22 carried by the gun 10. This switch may be connected to a remotely located control box 25 by wires carried in the cable 17. The control box 25 regulates the flow of gas from a gas source 26 and the application of electrical current to the gun 10 through hose 27 and wire 28, respectively.

As shown in FIG. 1, the wire moving apparatus of this invention is used in the hand held gun 10 to draw wire from cable 17 and to direct the wire through nozzle 18 to the workpiece. In those welding situations where the distance between the gun 10 and the wire source 14 exceeds the capacity of the wire moving apparatus, a booster 12 is used to pull the wire off the reel 14 and to assist in the movement of the wire through cable 17 to the hand held gun 10. When using the preferred embodiment of the invention, as will be described, the maximum length of cable 17 which may be used without one or more booster units 12 is approximately 8 feet. By designing the wire moving apparatus so that substantially no yielding of the wire surface occurs, the booster 12 may be operated continuously, if desired, even though the wire may be stalled since slippage between the wire and the wire moving mechanism of this invention does substantially no damage to the wire of the type which might cause welding problems.

The wire moving apparatus of this invention may be used in many devices, such as the hand held gun 10, the intermediate wire moving assembly or booster 12, and a spot welding gun 30. The spot welding gun in FIG. 2 includes a nozzle 31 which is designed to receive and direct shielding gas to the area being welded on the workpiece. Welding wire is directed to the workpiece through an electrically conductive guide tube 32 located centrally in the nozzle 31. The details of the wire guide and nozzle form no part of the present invention, however, no electrical current flows through the welding wire 15 until it exits from the wire guide 32 since current is applied through the guide to the wire through a sliding connector.

Figure 2:
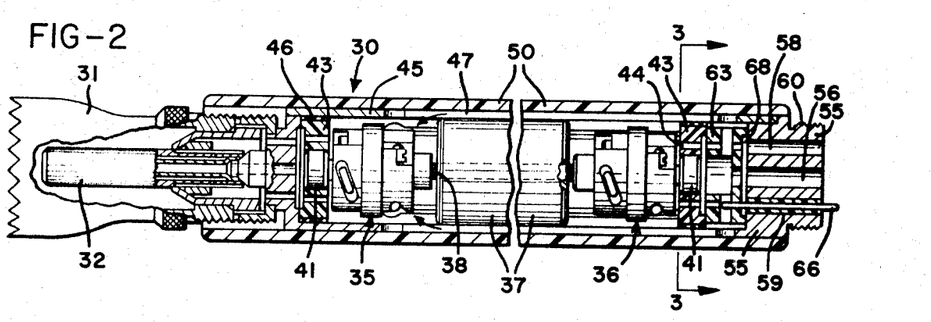
FIG. 2 is a view, partly in cross section, showing the wire feeding apparatus of this invention contained in a spot welding gun.
Figure 3:
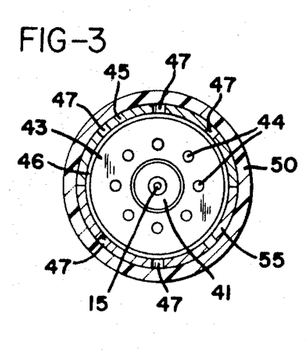
FIG. 3 is a cross sectional view taken along line 3—3 in FIG. 2.

The wire feeding apparatus of this invention includes two rotary to linear actuators 35 and 36 which are rotated simultaneously by an electric motor 37. It is to be understood that hydraulic or pneumatic motors could also be used if desired. The rotary to linear actuators 35 and 36 and the motor 37 are provided with axially extending openings through which the welding wire is moved toward and through the wire guide 32.

Figure 5:
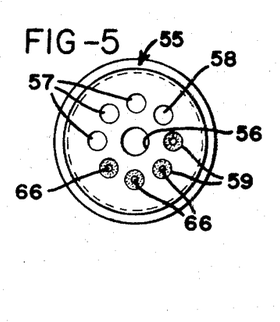
FIG. 5 is an end view of an end connector for inert gas, welding current and motor power for use in the embodiment of FIG. 3.

One end of each rotary to linear actuator 35 and 36 is attached to the armature or rotor shaft 38 of motor 37. The other end of each actuator is supported by bearings 41, and these bearings are carried by support disks 43. As shown in FIG. 5, each disk 43 includes a plurality of holes 44 surrounding the bearing 41, and these slots provide a passageway for shielding gas to pass around the bearing, through the gun, and into the nozzle where it is then directed over the weld.

The motor 37 is supported within the gun 30 in a slotted cylindrical inner casing 45 formed in two sections to facilitate assembly of the gun. Disks 43 are surrounded by a cushioning material 46, such as rubber, and are also supported within the gun by the inner casing 45. AS shown in FIG. 2, the inner casing 45 is provided with a plurality of longitudinally extending slots 47, the length of which exceeds the length of the motor in order to provide a passageway around the motor for the shielding gas. The entire gun 30 is enclosed with an insulating cylindrical tube 50 which not only protects the mechanism within the gun but also provides electrical insulation and protection to the operator.

The gun 30 includes an electrically conductive metallic connector 55 located within the cylindrical tube 50 to receive shielding gas, welding wire, control wires, and electrical current from the cable 17. The connector 55 may be formed integrally with the lower half of the casing 45. Electrical current from cable 17 flows through the connector 55 and casing 45 around the motor and into the wire guide 32.

The connector 55 is provided with a central opening 56 through which the welding wire may pass into the interior of the gun, and a plurality of smaller openings 57, 58 and 59. A threaded exterior 60 on the connector 55 receives the threaded connection 61 of the cable 17.

Figure 4:
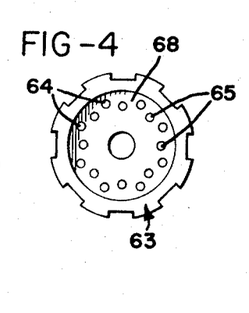
FIG. 4 is a view of a gas diffuser used in the embodiment of FIG. 3.

A gas diffuser element 63 is interposed between the supporting disk 43 and the connector 55 and is provided with a plurality of openings 64 and 65. Openings 65 are aligned with the openings 59 and support electrical pins 66 which extend through the connector 55 to the exterior of the gun housing. In the preferred embodiment, four such pins are employed and are used for the control of the speed of motor 37. These pins may also be connected to control switches, such as switch 22 shown in FIG. 1. The connector pins are insulated from the metallic connector 55 by epoxy filling the openings 59.

The openings 64 communicate with a recess 68 formed in the diffuser element 63, and shielding gas which passes through opening 58 into the recess 68 then passes through the opening 64 in diffuser element 63 and the holes 44 and disk 47 to the interior of the motor housing. This shielding gas flows around the actuator 37, through the slot 47 surrounding the motor 37, around the actuator 35 and through corresponding openings 44 in the disk 43 at the left end of the assembly and into the nozzle 31 where it is then directed to the weld.

The movement of the gas around the motor 37 tends to cool the motor thus allowing continuous operation of the motor under heavy loads without exceeding its temperature limits. The gas also flows around both rotary to linear actuators 35 and 36 and carries any dirt or wire contamination which might be dislodged by the interaction between the rotary to linear actuators and the wire passing therethrough. This flow of gas therefore removes these contaminates from the gun housing.

Figure 9:
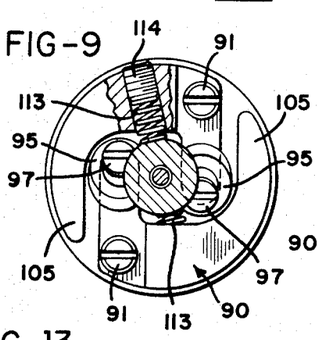
FIG. 9 is a view of another embodiment showing an alternate placement of biasing springs relative to the roller supporting arms.
Figure 10:
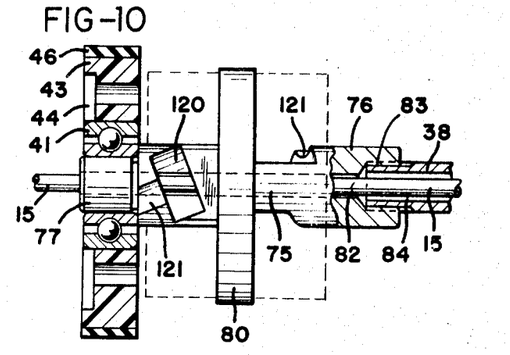
FIG. 10 is a view showing the body member of the wire feeding assembly of this invention and one of the supporting bearings for mounting the assembly in a welding gun.

Rotary to linear actuator 35 is shown in detail in FIGS. 6 through 13 and includes a mandrel or body 75 having a cylindrical right end 76, a cylindrical left end 77, and a generally centrally located flange 80 which is provided with a plurality of threaded holes 81. As shown in FIG. 10, the left end 77 is pressed into the bearing 41. The body 75 may be machined or formed from either metal or from a synthetic material, such as laminated fiber. As best shown in FIG. 10, an opening or aperture 82 extends completely through the body and is coaxial with the axis of rotation of the actuator 35. The opening 82 is sufficiently large to permit the largest diameter wire 15 to be used in the embodiment shown, to pass through the actuator body without interference.

The axial opening 82 is enlarged at 83, at the right end of the body as viewed in FIG. 10, to receive the drive shaft 38 of motor 37. In the preferred embodiment, splines prevent relative rotation between the drive shaft 38 and the body 75. Alternatively, the drive shaft 38 could be secured to the body 75 by set screws. The drive shaft 38 is also provided with an axially aligned opening 84 to allow the wire 15 to pass through the motor into the opening 82 and then outwardly from the actuator 35 to the workpiece.

Figure 12:
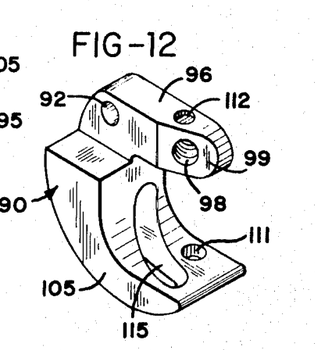
FIG. 12 is a perspective view of a roller supporting arm and centrifugal weight.

A pair of arcuately shaped arms 90 are pivotally attached to each side of the flange 80 by screws 91 which are received into the threaded openings 81. Preferably, the screws 91 are provided with shoulders which permit them to be tightened securely to the flange 80 while at the same time allowing the arms 90 to pivot freely around the body of the screw. As shown in FIG. 12, each arm 90 is provided with an opening 92 which is slightly larger than the body of the screw 91.

The wire engaging roller 95 is rotatably mounted to the inwardly extending portion 96 of each arm 90 by screws 97. These screws also include a shoulder which allows them to be tightened securely to the arms 90 without restricting the freedom of rotation of the rollers 95. Each of the inwardly extending portions 96 includes a threaded opening 98 which is adapted to receive the screws 97 (FIG. 12). Of course, rivets may also be used to support the rollers 95 for rotation. The inwardly extending portion 96 of each arm 90 also has formed there on a flat surface 99 which is perpendicular to the axis of the threaded opening 98 to permit free rotation of the roller 95.

Figure 6:
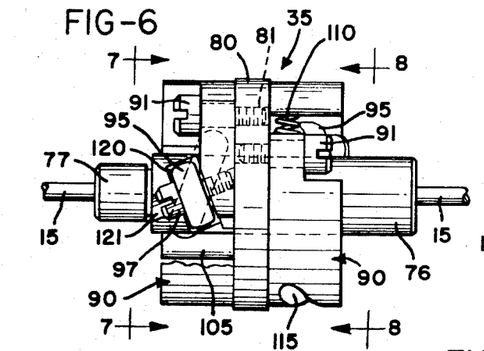
FIG. 6 is an enlarged view of a wire feeding assembly employing two pairs of mutually opposed rollers.
Figure 7:
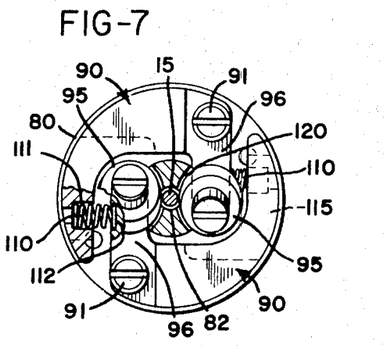
FIG. 7 is a view of the wire feeding assembly taken along line 7—7 in FIG. 6.
Figure 8:
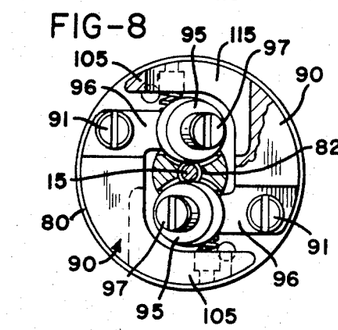
FIG. 8 is another view of the wire feeding assembly taken along line 8—8 in FIG. 6.
Figure 11:
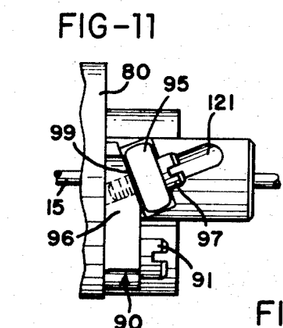
FIG. 11 is a view showing particularly an inclined roller and its relation to the actuator body member.

The threaded opening 98 is therefore the axis of rotation of the rollers 95 and is seen to be spaced radially outwardly from the wire 15 and is inclined at an acute angle A relative to the axis of rotation of the body 75, as viewed in FIGS. 6 and 11. The angle A may vary from 0° to 90°however in the preferred embodiments, the angle is normally between 5° and 45°.

In the embodiment of the invention shown in the accompanying drawings, three-eighth inch rollers are used to move wire which may vary in size from 0.030 to 0.080 inch. These rollers are inclined at an angle of 20° when moving steel wire. This results in a linear movement of 0.039 inch per revolution for 0.035 inch wire. Therefore, at a motor speed of 10,000 rpm, the wire is moved through the actuator at 390 inches per minute. For aluminum wire, the rollers are inclined at an angle of 30° with a corresponding increase in the linear speed of the wire. The angle is chosen according to the desired speed ratio between the angular velocity of the body 75 and the longitudinal feed rate of the wire 15. The rollers 95 on one side of the flange 80 are arranged in mutually opposed relation with respect to the wire 15 to prevent any unnecessary distortion of the wire.

Thus, as the body 75 rotates, the rollers 95 will follow a helical path on the wire 15 and since the rollers are prevented from moving longitudinally relative to the body, a component of force will thus be imparted to the wire to move it longitudinally through the opening 82.

Figure 14:
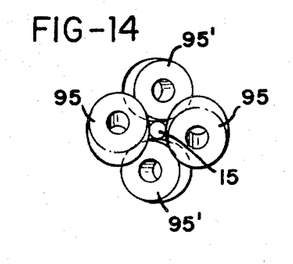
FIG. 14 is a diagrammatic view showing the relationship of the wire engaging rollers to each other and to the welding wire.

As shown in FIG. 14, when more than one pair of mutually opposed pairs of rollers are employed, the rollers are generally evenly spaced around the wire 80. In FIG. 14, the rollers 95 are mutually and diametrically opposed, i.e., their points of contact are perpendicular to wire 80. Rollers 95' are also mutually opposed, longitudinally spaced from the rollers 95, and their points of contact with the wire are 90° from the points of contact of rollers 95.

Each arm 90 includes an integrally formed arcuately shaped weight 105 located on the opposite side of the pivot screw 91 from the rollers 95. As the body 82 rotates, the weights 105 will tend to move outwardly due to centrifugal force and will therefore urge each roller 95 into positive engagement with the wire 15. Thus, as the rotational speed of the body 75 increases, the force of the rollers 95 against the wire 15 will also increase. The size and weight of the arms 90 and the weights 105 and the rotational speed of the body 75 will determine the actual force exerted by each roller on the wire 15.

Biasing means are provided to insure adequate force is applied to urge the rollers 95 into the wire 15 at low rotational speeds of the body 75. In the embodiment shown in FIG. 7, this biasing means includes small springs 110 which act to push the weights 105 outwardly. These springs also act to push the corresponding roller on the opposite side of the wire into the wire. The springs 110 are received into retaining cups 111 formed in the weight 105 and cups 112 formed on the inwardly extending portion 96. It is also contemplated that the springs could interact between the weights 105 and the body 75 with substantially the same results.

An alternative embodiment is shown in FIG. 9 and includes springs 113 acting between arms 90 and the body 75. The springs are held in place by screws 114 which also control the biasing force of the springs.

Figure 13:
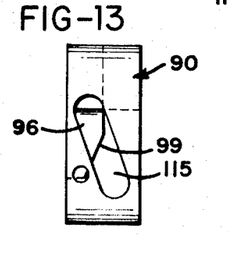
FIG. 13 is a view of the roller carrying arm showing particularly a slot formed therein.

Each of the arms 90 is also provided with a slot 115 positioned opposite to roller of the complementary arm on the same side of the flange 80. This slot provides a relief and permits any accumulation of wire coating compound which may be removed by interaction of the wire with the rollers 95 to be thrown outwardly and away from the actuator 35. This prevents a buildup of dirt and prevents interference between a roller 95 and the weight 105 on the adjacent arm. Movement of inert gas around the actuators also aids in removing this dirt.

The body 75, as shown in FIG. 10, is formed or machined with a slot 120 having sufficient width to accommodate the rollers 95 and a depth such that the opening 82 through the center of the body is exposed. A slot 121 is also provided to accommodate the shaft of the milling tool which forms the opening 120, if this machining process is used, and to accommodate the screw 97 which holds the roller 95 in place. The depth at which the slot 120 is cut depends in part upon the range of wire sizes which are to be accommodated by any particular actuator 35, it being desired that there be no interference between the roller 95 and the body 75 when feeding wires of the smallest diameter is contemplated.

Figure 15:
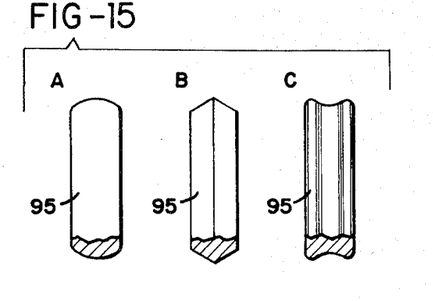
FIGS. 15a-15c show various cross sectional configurations of rollers which may be used in this invention.

FIG. 15 shows the cross sectional configuration of rollers which may be used with this invention. FIG. 15a is the roller configuration used in the preferred embodiment in that it allows the wire 15 to be easily inserted into and through the actuator since the wire may cam the roller outwardly against the biasing means. The roller shown in FIG. 15b has a narrow contact area and may be used in those situations where high forces per unit area against the wire are desired. The roller configuration of FIG. 15c has also been used with the rotary to linear actuators of this invention and give two points of contact for each roller. A tungsten carbide roller surface is preferred due to its wear characteristics.

Figure 17:
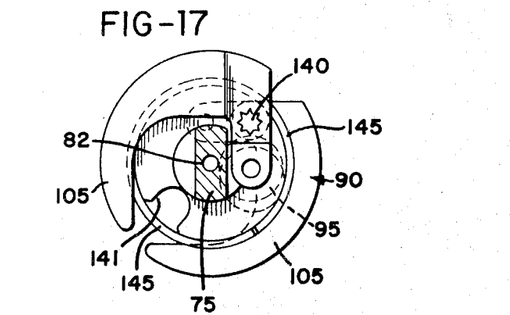
FIG. 17 is an end view of another embodiment of the invention wherein a torsion bar is employed to mount the roller carrying arms on the body.
Figure 18:
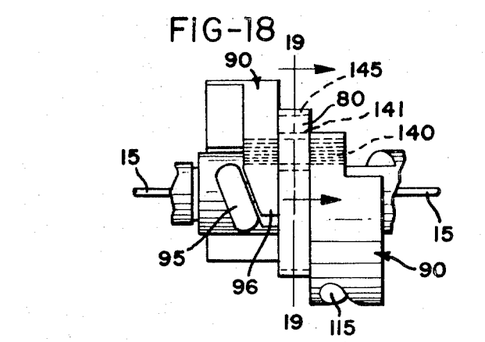
FIG. 18 is a side view showing the relationship of the torsion bar to the body and to the roller carrying arms.
Figure 19:
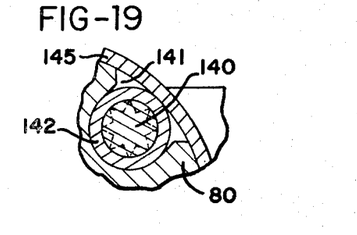
FIG. 19 is a cross sectional view taken along lines 19—19 of FIG. 18.

Another embodiment of the invention is shown in FIGS. 17 through 19 wherein the means for biasing the rollers into frictional engagement with the wire 15 includes torsion bar 140 extending through opening 141 in flange 80. In FIGS. 17 and 18, only one arm on either side of the flange 80 is shown for the purpose of clarity in illustration. It is to be understood, however, that the complementary arms on both sides of the flange will also be installed.

In this embodiment, torsion bar 140 pivotally supports arms 90 located on either side of the flange 80 and is rigidly secured to each arm, but not to the flange 80. The torsion bar is provided with knurled or splines on each end which are forced into openings 92 in the arms of 90. The torsion bar 140 is encircled by a cylinder 142 where the torsion bar passes through the flange 80 in the opening 141, and the torsion bar and the two roller supporting arms 90 are held in the opening 141 by a ring 145 which completely encircles the flange.

As the wire 15 is moved through the central opening 82 in the body 75, the rollers 95 on opposite sides of the flange which are supported by the arms carried by one torsion bar 140 will be urged outwardly by the wire and will therefore cause the torsion bar to twist. Of course, the twist of the torsion bar is designed to be less than the yield strength of the material from which the torsion bar is made. Typically, a five degree deflection will be all that is needed in order to apply sufficient biasing to the rollers to assist in moving the wire 15 at low rotational speeds of the body 75.

Figure 20:
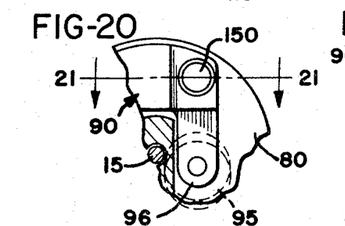
FIG. 20 is an end view of a portion of an actuator showing another embodiment of the invention wherein each arm is pivotally mounted to the body by a torsion bar.
Figure 21:
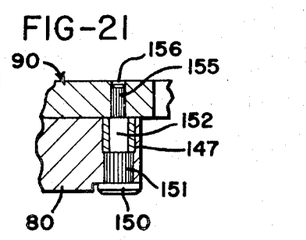
FIG. 21 is a cross sectional view taken along line 21—21 in FIG. 20.

Another embodiment of the invention wherein a torsion bar is used as the pivotal support for the arm 90 is shown in FIGS. 20 and 21. In this embodiment, flange 80 is provided with an opening 147 which receives the torsion bar 150. The torsion bar has a large diameter section 151 near its head which is splined and received into the opening 147 and is prevented from moving relative to the flange 80 by the splines. A reduced section 152 is allowed to move freely within the opening 147, and a further reduced section 155 is forced into a smaller opening 156 in the arm 90 and is also prevented from movement relative to the arm by splines. Thus, one end of the torsion bar 150 is secured to the flange 80 and its other end is secured to the arm 90. In this embodiment, it is therefore necessary to rotate the roller toward the wire by whatever amount is necessary to result in sufficient biasing force against the wire for movement at low rotational speeds.

Figure 22:
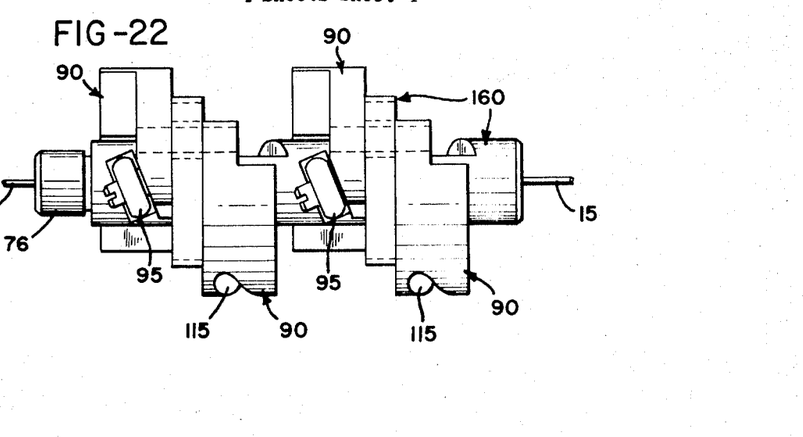
FIG. 22 is a view showing four pairs of mutually opposed inclined rollers mounted on a single body member.

As previously mentioned, the force per unit area on the wire must be controlled in order to prevent damage to the wire as it moves through the rotary to linear actuators, although some yielding of the wire surface at the point of contact with the inclined rollers is desirable in some applications since it improves the resulting pulling force over that achieved by friction alone. With some wires of low tensile strength, such as aluminum, it is desirable to distribute the forces acting on the wire in order to provide the necessary pulling force. This can be done in several ways, such as by providing a plurality of actuators 35 as described above, or by providing a single actuator having more than two pairs of actuators mounted thereon. FIG. 22 shows one actuator body 160 which is provided with four pairs of mutually opposed rollers.

Figure 23:
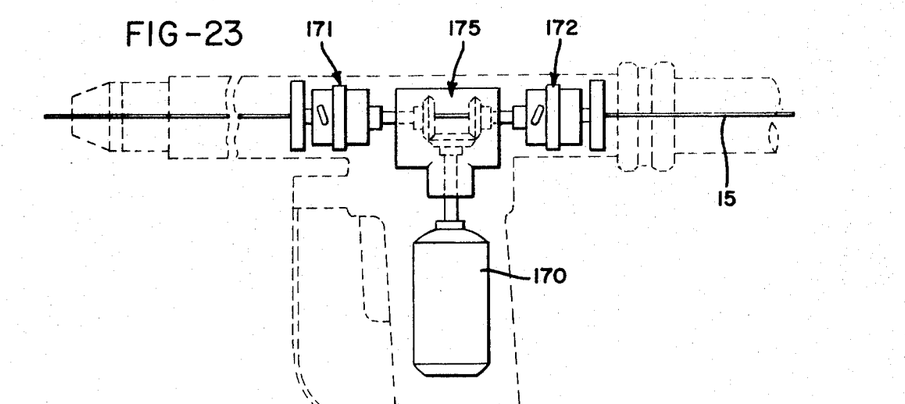
FIG. 23 is a view showing an alternative embodiment wherein a single motor rotates two rotary to linear actuators in opposite directions and wherein the rollers of one actuator are inclined in a direction opposite of the rollers of the other actuator in order to eliminate any tendency for twisting the wire as it it moved linearly through the actuator.

For small diameter wire, e.g., 0.020 inch and smaller, and with wires of low tensile strength, e.g., soft aluminum or non-heat treated magnesium, there is a tendency for the rotation of the actuator to twist the wire. To eliminate this twisting tendency, the apparatus shown in FIG. 23 may be used. Here, two rotary to linear actuators are rotated in opposite directions by a motor 170 which is mechanically connected to the actuators 171 and 172 through a gear assembly 175. The rollers in the actuator 171 are inclined relative to the wire in a direction opposite to the inclination of the rollers in actuator 172 so that the wire will move in the same direction, from right to left, as viewed in FIG. 23, through the welding gun even though the actuators are rotating in opposite directions.

Figure 16:
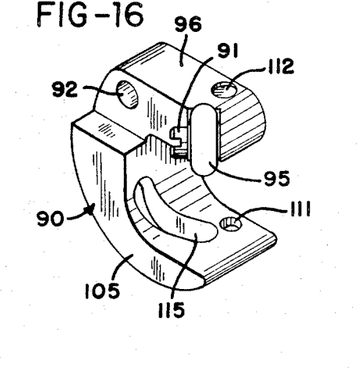
FIG. 16 is a pictorial view showing an embodiment of the roller carrying arm and centrifugal weight when the roller is inclined in the opposite direction.

FIG. 16 shows an arm 90 which has mounted thereon a roller 95 which is inclined in a direction opposite to a roller mounted on the arm shown in FIG. 12. Of course, the body design and particularly the orientation of the slots 120 and 121 in the body must be modified in order to accommodate this roller orientation. Of course, the body 75 would then have to be rotated in the opposite direction in order to move the wire linearly in the same direction.

Figure 24:
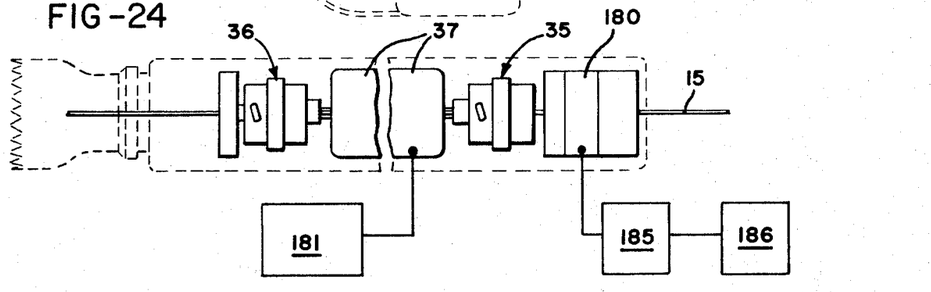
FIG. 24 is a view, partly in cross section, of a spot welding gun wherein the rotary to linear actuators run continuously and wire movement controlled by wire gripping means.

In a spot welding application where accurate control of the wire movement is required, it is desirable to eliminate the inertial effects in starting and stopping the linear actuator and motor used to drive the actuators. Since no substantial damage to the wire occurs while it is stalled, even though the actuators continue rotating, accurate control over the movement of the wire may be obtained by including wire gripping means, such as a solenoid brake, to control the movement of the wire while allowing the actuators to rotate continuously. One embodiment of the invention using this principle is shown in FIG. 24. Here, wire 15 is directed through rotary to linear actuators 35 and 36, and a timer controlled solenoid brake 180 controls the movement of the wire. The actuator motor 37 is supplied with power through a constant voltage source 181 and rotates the actuators continuously. A timer 185 allows movement of the wire for predetermined periods of time, either automatically or under the direction of a separate control circuit 186. For example, the timer 185 may allow the wire to move for 0.4 second at six second intervals or for 0.4 second each time a trigger pulse is generated by the control circuit 186. Accurate movement of the wire through small distance increments is therefore provided by this arrangement.

It is desired, the number of inclined rollers acting on the wire may be increased and the biasing force of the rollers against the wire reduced to maintain the same moving force to the wire. This will result in less yielding of the wire surface while premitting the same moving force to be generated and is preferred in those applications, e.g., booster or spot welding gun, where the wire may be allowed to stall.

Thus, a rotary to linear actuator has been described which employs centrifugal weights to urge inclined rollers into frictional engagement with the wire which is then moved longitudinally as the rollers are rotated about the wire. Also, an improved welding gun or other wire feeding apparatus has been described which includes a motor having a central opening extending axially therethrough to rotate the rotary to linear actuators. Such coaxial construction permits fabrication of welding guns and wire feeding mechanisms having small cross sectional areas. The inclined rollers may be biased against the wire by springs or by torsion bars.

While the forms of apparatus herein described constitute preferred embodiments of the invention, it is to be understood that the invention is not limited to these forms of apparatus, and that changes may be made therein without departing from the scope of the invention which is defined in the appended claims.

What is claimed is:

1. A wire moving device comprising
actuator means for moving a wire in a linear direction as said actuator means is rotated about the wire;
said actuator means including a body having an axis about which it may be rotated;
means defining an axially extending opening in said body through which wire may pass;
at least one roller mounted on said body for rotation therewith, the axis of said roller being at a fixed inclination relative to the axis of said body, said roller engaging the wire to impart thereto a linear component of force as said body and said roller are rotated; and
brake means for gripping said wire to control movement in a linear direction through said actuator means while said actuator means rotates continuously about the wire thereby providing for accurate control of wire movement.

2. The wire moving device of claim 1 wherein said actuator means further includes
an arm mounted on said body for supporting said roller; and
a centrifugal weight on said arm which, as the body is rotated, acts to counterbalance at least the centrifugal force acting on said roller as said body is rotated.

3. The wire moving device of claim 1 wherein said means for rotating said body includes an electric motor having an armature connected to rotate said body, and means forming an axially extending opening through said armature concentric with the opening in said body through which wire may pass.

4. The wire moving device of claim 1 wherein said means for gripping said wire includes a solenoid brake which controls the movement of said wire in a linear direction while said actuator means rotates continuously.

5. The wire moving device of claim 1 further including an electric motor for rotating said actuator means and a constant voltage source for supplying power to said electric motor to rotate said actuator continuously at a substantially constant speed.

6. The wire moving device of claim 1 for use in spot welding wherein said actuator means rotates about said wire continuously, said roller having an outer circumferential surface which engages the wire and which causes no substantial damage to the wire while the linear motion of the wire is restricted by said brake means.

7. The wire moving device of claim 6 wherein said brake means includes a solenoid brake, said device further including timer means for releasing said brake for predetermined periods of time to move predetermined increments of wire through said device during each cycle of operation.

8. A wire moving device comprising
a body having an axially extending opening through which wire may pass,
at least two rollers mounted on said body for rotation therewith, the axis of each roller being inclined relative to teh axis of said body, said rollers engaging the wire to impart thereto a component of force to move the wire axially as said body and said rollers are rotated,
means mounted for rotation with said body for supporting each of said rollers and including centrifugal weights which act against the centrifugal force on said rollers as said body and rollers are rotated to hold said rollers in engagement with the wire, and
brake means for gripping said wire to restrain its movement in the axial direction while said body continues to rotate about the wire thereby to provide for accurate control of wire movement.

* * * * *